(12) United States Patent
Johnson et al.

(10) Patent No.: US 10,362,725 B2
(45) Date of Patent: *Jul. 30, 2019

(54) CONDUIT SYSTEM FOR A PNEUMATIC DISTRIBUTION SYSTEM OF AN AGRICULTURAL IMPLEMENT

(71) Applicant: CNH Industrial America LLC, New Holland, PA (US)

(72) Inventors: Chad M. Johnson, Arlington Heights, IL (US); Marvin A. Prickel, Homer Glen, IL (US); Grant T. MacDonald, Ames, IA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/784,491

(22) Filed: Oct. 16, 2017

(65) Prior Publication Data

US 2018/0035602 A1 Feb. 8, 2018

Related U.S. Application Data

(62) Division of application No. 14/792,000, filed on Jul. 6, 2015, now Pat. No. 9,854,728, which is a division of application No. 13/737,276, filed on Jan. 9, 2013, now Pat. No. 9,072,216.

(51) Int. Cl.
*A01C 7/08* (2006.01)

(52) U.S. Cl.
CPC .............. *A01C 7/082* (2013.01); *A01C 7/081* (2013.01); *A01C 7/084* (2013.01)

(58) Field of Classification Search
CPC ........... A01C 7/082; A01C 7/081; A01C 7/08; A01C 7/00; A01C 7/084
See application file for complete search history.

(56) References Cited

U.S. PATENT DOCUMENTS

| | | |
|---|---|---|
| 3,964,639 A | 6/1976 | Norris et al. |
| 5,996,516 A | 12/1999 | Benneweis et al. |
| 6,296,425 B1 | 10/2001 | Memory et al. |
| 6,367,396 B1 | 4/2002 | Meyer |
| 6,443,671 B1 | 9/2002 | Weiste |
| 6,505,569 B1 | 1/2003 | Richard |
| 6,584,920 B1 | 7/2003 | Cresswell |
| 6,994,038 B2 | 2/2006 | Mariman et al. |

(Continued)

*Primary Examiner* — Christopher J. Novosad
(74) *Attorney, Agent, or Firm* — Rebecca L. Henkel; Rickard K. DeMille

(57) ABSTRACT

A pneumatic distribution system for an agricultural implement includes an inductor box having output ports and row units configured to receive an agricultural product and airflow from the output ports. A conduit system extends between the output ports of the inductor box and the row units. The conduit system is configured to direct the agricultural product and the airflow from each output port to a respective row unit. The conduit system includes a first conduit assembly extending between a first output port and a first row unit. The conduit system also includes a second conduit assembly extending between a second output port and a second row unit. A first average diameter of the first conduit assembly is smaller than a second average diameter of the second conduit assembly by at least approximately one percent.

20 Claims, 4 Drawing Sheets

(56) References Cited

U.S. PATENT DOCUMENTS

| | | |
|---|---|---|
| 7,162,962 B2 | 1/2007 | Fuessel et al. |
| 7,669,538 B2 | 3/2010 | Memory et al. |
| 7,866,269 B2 | 1/2011 | Naylor et al. |
| 8,033,230 B2 | 10/2011 | Naylor et al. |
| 8,234,987 B2 | 8/2012 | Georgison et al. |
| 9,072,216 B2 * | 7/2015 | Johnson ................ A01C 7/081 |
| 9,854,728 B2 * | 1/2018 | Johnson ................ A01C 7/081 |
| 2001/0014258 A1 | 8/2001 | Poncelet et al. |
| 2009/0148244 A1 | 6/2009 | Snowdon |

\* cited by examiner

CONDUIT SYSTEM FOR A PNEUMATIC DISTRIBUTION SYSTEM OF AN AGRICULTURAL IMPLEMENT

CROSS-REFERENCE TO RELATED APPLICATIONS

This application is a divisional of U.S. patent application Ser. No. 14/792,000, entitled "CONDUIT SYSTEM FOR A PNEUMATIC DISTRIBUTION SYSTEM OF AN AGRICULTURAL IMPLEMENT", filed Jul. 6, 2015, which is a divisional of U.S. patent application Ser. No. 13/737,276, entitled "CONDUIT SYSTEM FOR A PNEUMATIC DISTRIBUTION SYSTEM OF AN AGRICULTURAL IMPLEMENT", filed Jan. 9, 2013, now U.S. Pat. No. 9,072,216. Each of the foregoing applications is herein incorporated by reference in its entirety.

BACKGROUND

The invention relates generally to ground working equipment, such as agricultural equipment, and more specifically, to a conduit system for a pneumatic distribution system of an agricultural implement.

Generally, planting implements (e.g., planters) are towed behind a tractor or other work vehicle via a mounting bracket secured to a rigid frame of the implement. These planting implements typically include multiple row units distributed across the width of the implement. Each row unit is configured to deposit seeds at a desired depth beneath the soil surface, thereby establishing rows of planted seeds. For example, each row unit may include a ground engaging tool or opener (e.g., an opener disc) that forms a seeding path for seed deposition into the soil. In certain configurations, a gauge wheel is positioned a vertical distance above the opener to establish a desired trench depth for seed deposition into the soil. As the implement travels across a field, the opener excavates a trench into the soil, and seeds are deposited into the trench. In certain row units, the opener is followed by a packer wheel that packs the soil on top of the deposited seeds.

Certain planting implements include a remote seed tank, and a pneumatic distribution system configured to convey seeds from the tank to each row unit. For example, the pneumatic distribution system may include an inductor box positioned beneath the seed tank. The inductor box is configured to receive seeds from the tank, to fluidize the seeds into an air/seed mixture, and to distribute the air/seed mixture to the row units via a network of pneumatic hoses/conduits. Each row unit, in turn, receives the seeds from the pneumatic hoses/conduits, and directs the seeds to a metering system. The metering system is configured to provide a flow of seeds to a seed tube for deposition into the soil. By operating the metering system at a particular speed, a desired seed spacing may be established as the implement traverses a field.

In planting implements with an inductor box, a distance between the inductor box and the row units varies along the width of the planting implement. Thus, the network of pneumatic hoses/conduits includes certain sections with short runs between the inductor box and row units near the inductor box, and certain sections with long runs between the inductor box and row units located farther from the inductor box. Unfortunately, due to the length of the conduits, longer runs have less airflow than shorter runs. Accordingly, seeds may not be uniformly distributed to the row units. For example, row units closer to the inductor box may receive too many seeds, while row units farther from the inductor box may receive too few seeds.

BRIEF DESCRIPTION

In one embodiment, a pneumatic distribution system for an agricultural implement includes an inductor box having output ports. The inductor box is configured to receive an agricultural product and an airflow, to combine the agricultural product with the airflow, and to direct the agricultural product and the airflow through the output ports. The pneumatic distribution system also includes row units that are each configured to receive the agricultural product and the airflow, and to deposit the agricultural product into soil. The pneumatic distribution system includes a conduit system extending between the output ports of the inductor box and the row units. The conduit system is configured to direct the agricultural product and the airflow from each output port to a respective row unit. The conduit system includes a first conduit assembly extending between a first output port and a first row unit. The conduit system also includes a second conduit assembly extending between a second output port and a second row unit. Moreover, a first average diameter of the first conduit assembly is smaller than a second average diameter of the second conduit assembly by at least approximately one percent. A first length of the first conduit assembly is smaller than a second length of the second conduit assembly.

In another embodiment, a pneumatic distribution system for an agricultural implement includes an inductor box having output ports. The inductor box is configured to receive an agricultural product and an airflow, to combine the agricultural product with the airflow, and to direct the agricultural product and the airflow through the output ports. The pneumatic distribution system also includes row units that are each configured to receive the agricultural product and the airflow, and to deposit the agricultural product into soil. The pneumatic distribution system includes a conduit system extending between the output ports of the inductor box and the row units. The conduit system is configured to direct the agricultural product and the airflow from each output port to a respective row unit. The conduit system includes a first conduit assembly extending between a first output port of the plurality of output ports and a first row unit of the plurality of row units, and a second conduit assembly extending between a second output port of the plurality of output ports and a second row unit of the plurality of row units. The first conduit assembly includes a first hose coupled to the first output port and a first tube coupled to the first hose. The second conduit assembly includes a second hose coupled to the second output port and a second tube coupled to the second hose. A first inner diameter of the first tube is smaller than a second inner diameter of the second tube.

In a further embodiment, a pneumatic distribution system for an agricultural implement includes an inductor box having output ports. The inductor box is configured to receive an agricultural product and an airflow, to combine the agricultural product with the airflow, and to direct the agricultural product and the airflow through the output ports. The pneumatic distribution system also includes row units that are each configured to receive the agricultural product and the airflow, and to deposit the agricultural product into soil. The pneumatic distribution system also includes a conduit system extending between the output ports of the inductor box and the row units. The conduit system is configured to direct the agricultural product and the airflow from each output port to at least two row units. The conduit system includes a first hose extending between a first output port and a first row unit, and a second hose extending between the first row unit and a second row unit. A first inner diameter of the first hose is larger than a second inner diameter of the second hose.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
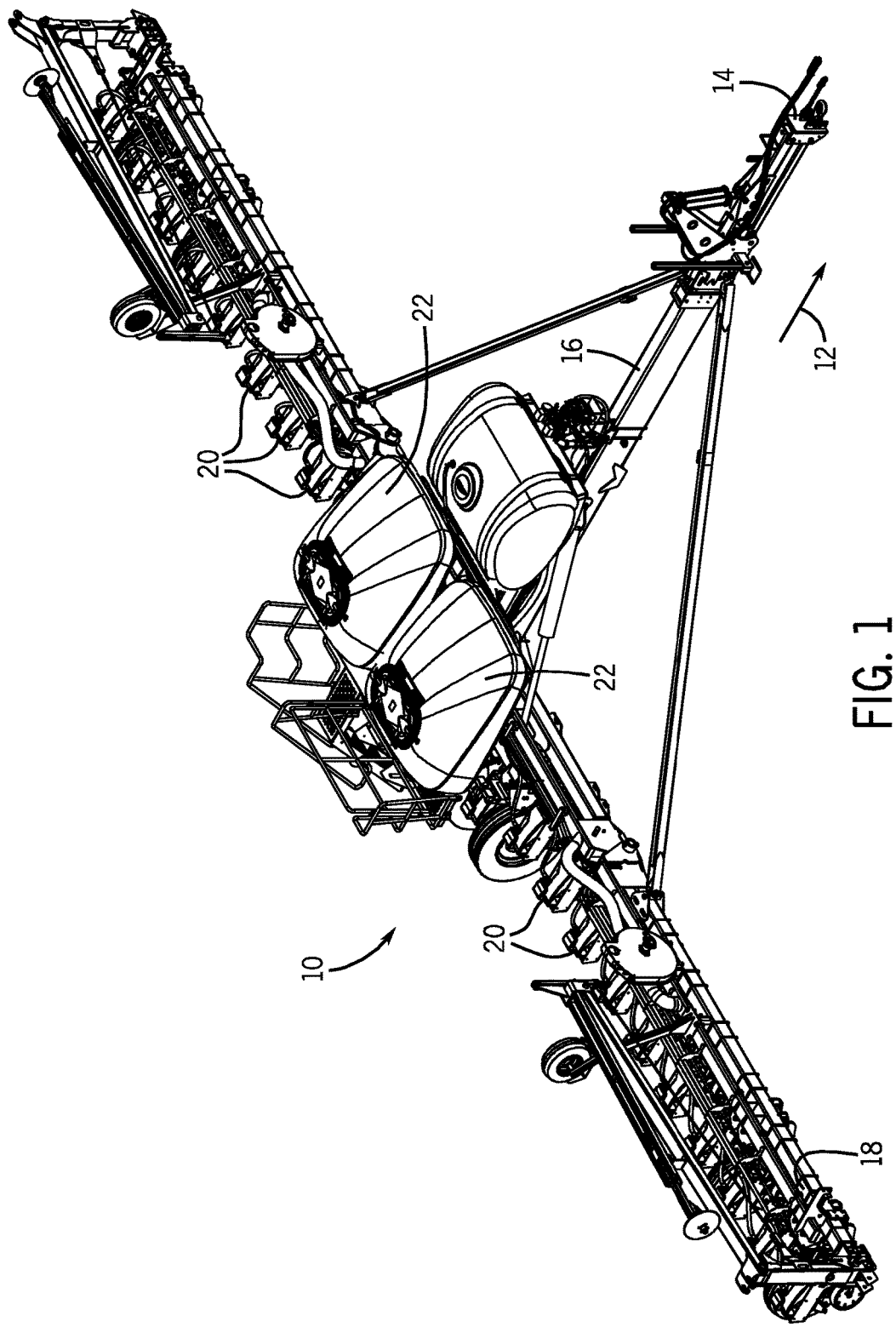
FIG. 1 is a perspective view of an embodiment of an agricultural implement configured to deposit seeds into a soil surface.

FIG. 1 is a perspective view of an embodiment of an agricultural implement 10 configured to deposit seeds into a soil surface. In the illustrated embodiment, the implement 10 is configured to be towed along a direction of travel 12 by a work vehicle, such as a tractor or other prime mover. The work vehicle may be coupled to the implement 10 by a hitch assembly 14. As illustrated, the hitch assembly 14 is coupled to a main frame assembly 16 of the implement 10 to facilitate towing of the implement 10 in the direction of travel 12. In the illustrated embodiment, the frame assembly 16 is coupled to a tool bar 18 that supports multiple row units 20. Each row unit 20 is configured to deposit seeds at a desired depth beneath the soil surface, thereby establishing rows of planted seeds. The implement 10 also includes seed tanks 22, and a pneumatic distribution system configured to convey seeds from the tanks to the row units 20. In certain embodiments, the pneumatic distribution system includes an inductor box positioned beneath each seed tank 22. Each inductor box is configured to receive seeds from a respective tank, to fluidize the seeds into an air/seed mixture, and to distribute the air/seed mixture to the row units 20 via a network of pneumatic hoses/conduits.

In certain embodiments, each row unit 20 includes a residue manager, an opening assembly, a seed tube, closing discs, and a press wheel. The residue manager includes a rotating wheel having multiple tillage points or fingers that break up crop residue, thereby preparing the soil for seed deposition. The opening assembly includes a gauge wheel and an opener disc. The gauge wheel may be positioned a vertical distance above the opener disc to establish a desired trench depth for seed deposition into the soil. As the row unit travels across a field, the opener disc excavates a trench into the soil for seed deposition. The seed tube, which may be positioned behind the opening assembly, directs a seed from a metering system into the excavated trench. The closing discs then direct the excavated soil into the trench to cover the planted seed. Finally, the press wheel packs the soil on top of the seed with a desired pressure.

While the illustrated implement 10 includes 24 row units 20, it should be appreciated that alternative implements may include more or fewer row units 20. For example, certain implements 10 may include 6, 8, 12, 16, 24, 32, or 36 row units, or more. In addition, the spacing between row units may be particularly selected based on the type of crop being planting. For example, the row units may be spaced 30 inches from one another for planting corn, and 15 inches from one another for planting soy beans.

The pneumatic distribution system may include a conduit system having multiple conduit assemblies. Each conduit assembly couples an output port of the inductor box to a respective row unit. In certain embodiments, a first diameter of a first conduit assembly may be larger than a second diameter of a second conduit assembly to facilitate an even distribution of agricultural product from the inductor box to the row units. Thus, particularly selecting the diameter of conduit assemblies that extend between the inductor box and the row units may compensate for variations in distance between the row units and the inductor box, thereby facilitating substantially uniform distribution of agricultural product through the pneumatic distribution system.

Figure 2:
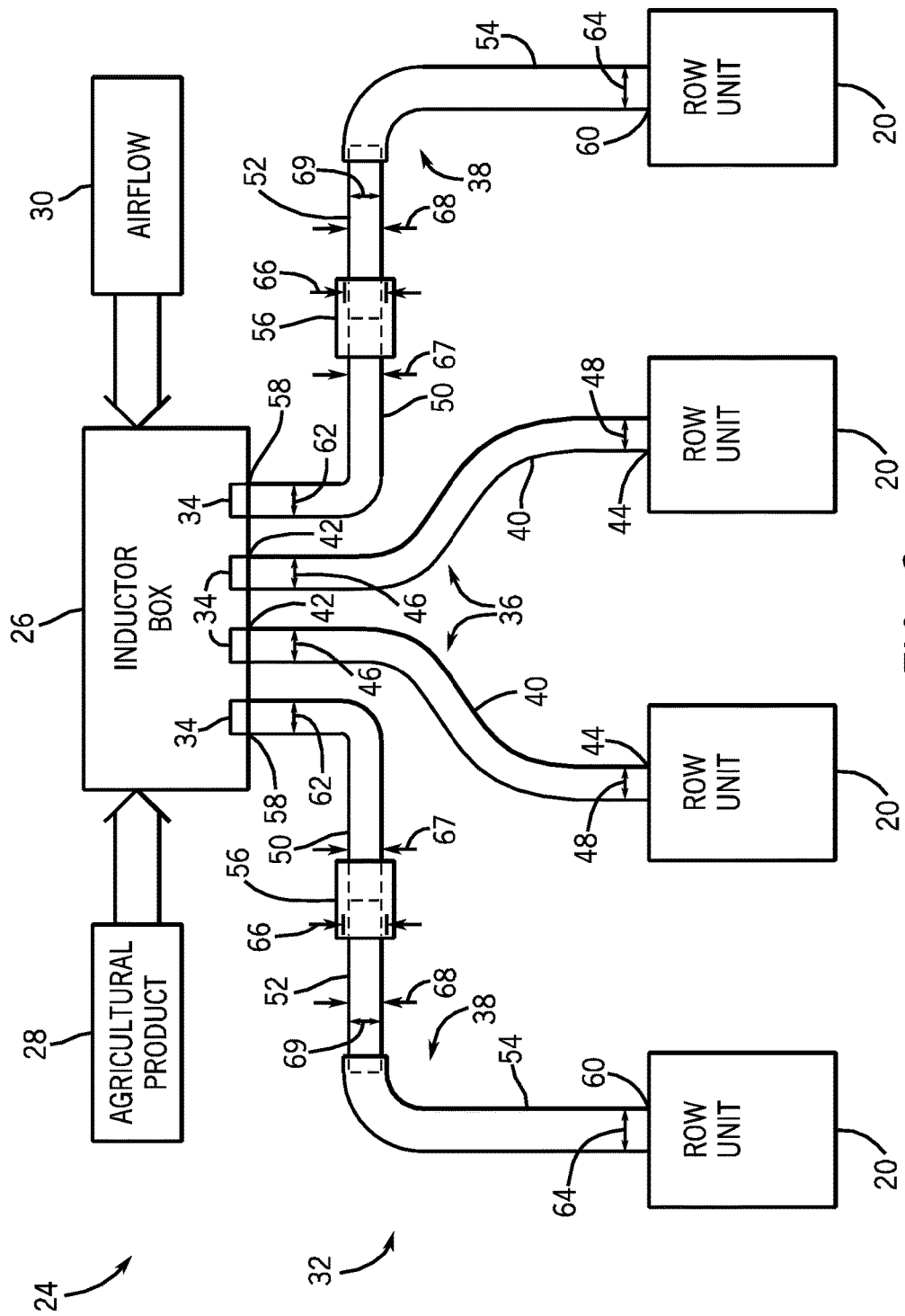
FIG. 2 is a schematic diagram of an embodiment of a pneumatic distribution system having two configurations of conduit assemblies.

FIG. 2 is a schematic diagram of an embodiment of a pneumatic distribution system 24 having two configurations of conduit assemblies. An inductor box 26 is configured to receive an agricultural product 28 from the seed tank 22. Moreover, the inductor box 26 is configured to receive an airflow 30, such as from an air supply. The inductor box 26 combines the agricultural product 28 with the airflow 30 and directs the combined agricultural product 28 and the airflow 30 through a conduit system 32 to the row units 20. Specifically, output ports 34 of the inductor box 26 direct the combined agricultural product 28 and the airflow 30 to the conduit system 32 for routing to the row units 20. The row units 20 are configured to receive the agricultural product 28 and the airflow 30, and to deposit the agricultural product 28 into soil.

The conduit system 32 is configured to direct the agricultural product 28 and the airflow 30 from the output ports 34 to the row units 20. In the illustrated embodiment, the conduit system 32 includes multiple conduit assemblies 36 or 38. In particular, the conduit system 32 includes one of the conduit assemblies 36 and 38 for each row unit 20. For simplicity, only four row units 20 are illustrated; however, the conduit system 32 may couple the inductor box 26 to more or fewer row units 20. The conduit assembly 36 includes a hose 40 extending between the output port 34 and the row unit 20. In certain embodiments, the hose 40 is a flexible hose to facilitate routing between the output port 34 and the row unit 20 along a tortuous path. The hose 40 includes an inlet 42 coupled to the output port 34, and an outlet 44 coupled to the row unit 20. An inner diameter 46 of the inlet 42 is substantially equal to the inner diameter 48 of the outlet 44. For example, in certain embodiments the inner diameter 46 of the inlet 42 and the inner diameter 48 of the outlet 44 may both be approximately 2.54 cm (e.g., 1.0 inches). As may be appreciated, the inner diameter 46 of the inlet 42 and/or the inner diameter 48 of the outlet 44 may be the same as the inner diameter of the hose 40.

The conduit assembly 38 includes a first hose 50, a tube 52, and a second hose 54. The tube 52 extends between the first hose 50 and the second hose 54. In certain embodiments, the first hose 50 and the second hose 54 are both flexible hoses that facilitate routing between the output port 34 and the row unit 20. Moreover, the tube 52 is less flexible than the first and second hoses 50 and 54, and extends in a substantially straight path. A coupler 56 is used to couple the first hose 50 to the tube 52, while the tube 52 is inserted into the second hose 54 to couple the second hose 54 to the tube 52. The conduit assembly 38 includes an inlet 58 that is coupled to the output port 34, and an outlet 60 that is coupled to the row unit 20. An inner diameter 62 of the inlet 58 is less than an inner diameter 64 of the outlet 60. For example, the inner diameter 62 of the inlet 58 may be approximately 2.54 cm (e.g., 1.0 inches), while the inner diameter 64 of the outlet 60 may be approximately 3.18 cm (e.g., 1.25 inches). As may be appreciated, the inner diameter 62 of the inlet 58 may be substantially equal to the inner diameter of the first hose 50. Moreover, the inner diameter 64 of the outlet 60 may be substantially equal to the inner diameter of the second hose 54.

An inner diameter 66 of the coupler 56 is substantially equal to an outer diameter 67 of the first hose 50 and an outer diameter 68 of the tube 52 such that the coupler 56 may couple the first hose 50 to the tube 52. Furthermore, the outer diameter 68 of the tube 52 is substantially equal to the inner diameter 64 of the second hose 54 such that the tube 52 may be inserted into the second hose 54. Moreover, the inner diameter 62 of the first hose 50 is substantially equal to an inner diameter 69 of the tube 52. Accordingly, the inner diameter 62 of the first hose 50 and the inner diameter 69 of the tube 52 are both smaller than the inner diameter 64 of the second hose 54. For example, the inner diameter 62 of the first hose 50 and the inner diameter 69 of the tube 52 may both be approximately 2.54 cm (e.g., 1.0 inches), while the inner diameter 64 of the second hose 54 may be approximately 3.18 cm (e.g., 1.25 inches). In addition, the inner diameter 48 of the hose 40 is smaller than the inner diameter 64 of the second hose 54. For example, the inner diameter 48 of the hose 40 may be approximately 2.54 cm (e.g., 1.0 inches), while the inner diameter 64 of the second hose 54 may be approximately 3.18 cm (e.g., 1.25 inches).

As may be appreciated, the row units 20 coupled to the conduit assemblies 36 may be positioned closer to the inductor box 26 than the row units 20 coupled to the conduit assemblies 38. Conversely, the row units 20 coupled to the conduit assemblies 38 may be positioned farther from the inductor box 26 than the row units 20 coupled to the conduit assemblies 36. For example, in an implement 10 having twelve rows, the conduit system 32 may be arranged as follows: row units 20 for rows four through nine (e.g., positioned in the central portion of the implement 10 proximate to the inductor box 26) may receive product from conduit assemblies 36, and row units 20 for rows one through three and ten through twelve (e.g., positioned laterally outward from rows four through nine) may receive product from conduit assemblies 38. As another example, in an implement 10 having sixteen rows, the conduit system 32 may be arranged as follows: row units 20 for rows six through eleven (e.g., positioned in the central portion of the implement 10 proximate to the inductor box 26) may receive product from conduit assemblies 36, and row units 20 for rows one through five and twelve through sixteen (e.g., positioned laterally outward from rows six through eleven) may receive product from conduit assemblies 38.

In certain embodiments, an average diameter of the conduit assemblies may vary between different conduit assemblies 36 and 38. For example, conduit assemblies 36 positioned in the central portion of the implement 10 may have a smaller average diameter than conduit assemblies 38 positioned laterally outward from the conduit assemblies 36. As may be appreciated, the average diameter of a conduit assembly may be a weighted average of the segments of the conduit assembly. For example, the average diameter of a conduit assembly having three segments may be calculated using the following formula: $AD=(L_{s1} \times ID_{s1}+L_{s2} \times ID_{s2}+L_{s3} \times ID_{s3})/(L_{s1}+L_{s2}+L_{s3})$, where AD is the average diameter, $L_{s1}$ is the length of first segment, $L_{s2}$ is the length of the second segment, $L_{s3}$ is the length of the third segment, $ID_{s1}$ is the inner diameter of first segment, $ID_{s2}$ is the inner diameter of second segment, and $ID_{s3}$ is the inner diameter of third segment. As may be appreciated, the difference between average diameters of adjacent conduit assemblies may be significant to provide more balance to the pneumatic distribution system 24. For example, in certain embodiments, there may be at least approximately a one percent difference between average diameters of adjacent conduit assemblies to provide more balance to the pneumatic distribution system 24.

By using the conduit system 32 described herein, the pneumatic distribution system 24 may operate in a more balanced manner. For example, by using smaller diameter hoses for the inner row units 20 and by using larger diameter hoses for the outer row units 20, agricultural product may be more uniformly distributed among the row units 20. Thus, planting operations may be performed more efficiently with fewer clogs in the conduit system 32 and/or with more evenly spaced seeds throughout the field.

Figure 3:
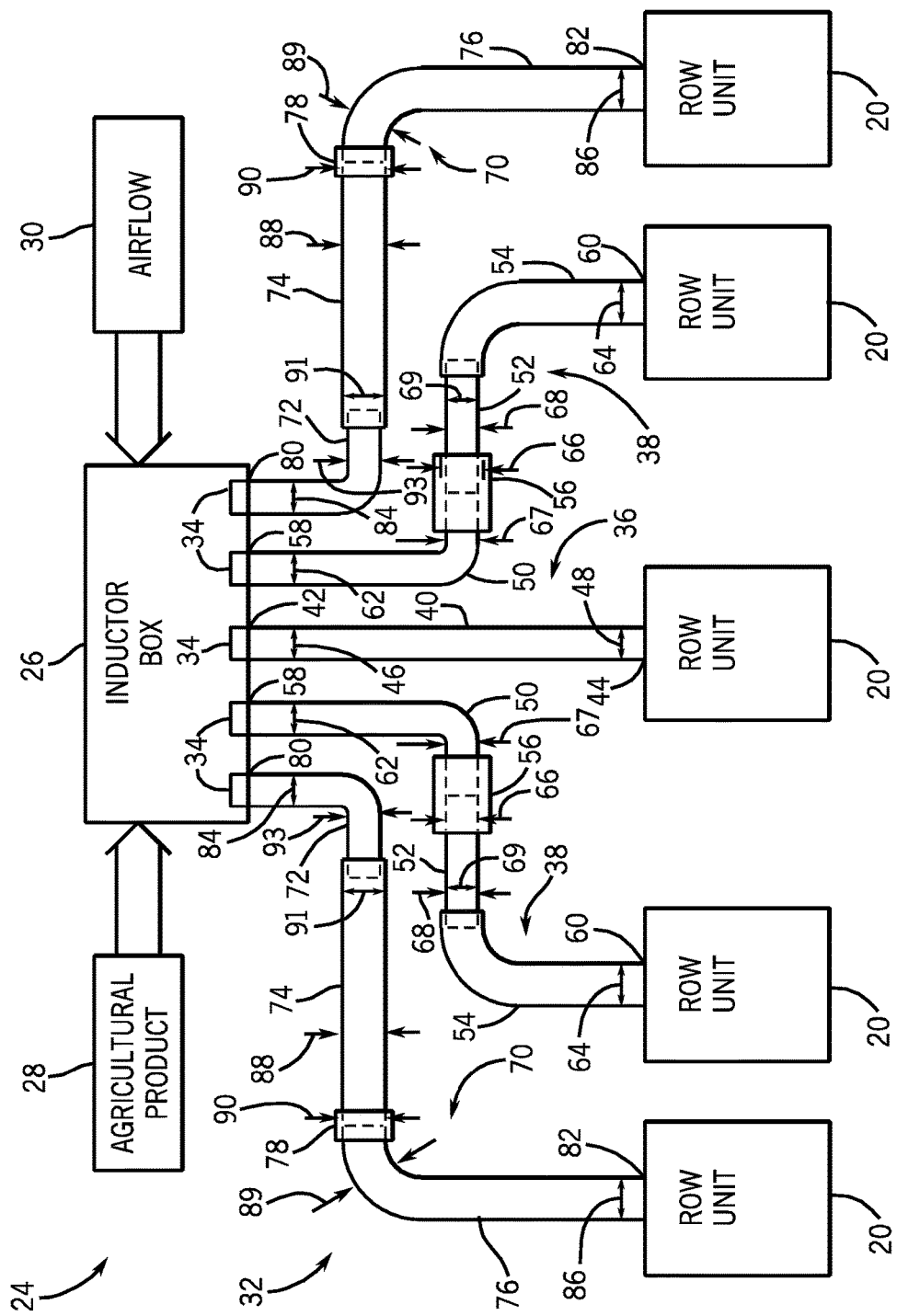
FIG. 3 is a schematic diagram of an embodiment of a pneumatic distribution system having three configurations of conduit assemblies.

FIG. 3 is a schematic diagram of an embodiment of the pneumatic distribution system 24 having three configurations of conduit assemblies. In the illustrated embodiment, the conduit assemblies 36 and 38 are coupled to the row units 20. Furthermore, a conduit assembly 70 is used to couple the inductor box 26 to outer most row units 20. The conduit assembly 70 includes a first hose 72, a tube 74, and a second hose 76. The tube 74 extends between the first hose 72 and the second hose 76. In certain embodiments, the first hose 72 and the second hose 76 are both flexible hoses that facilitate routing between the output port 34 and the row unit 20. Moreover, the tube 74 is less flexible than the first and second hoses 72 and 76, and extends in a substantially straight path. A coupler 78 is used to couple the second hose 76 to the tube 74. Moreover, the first hose 72 may be coupled to the tube 74 using a coupler, or any other suitable device. The conduit assembly 70 includes an inlet 80 that is coupled to the output port 34, and an outlet 82 that is coupled to the row unit 20. An inner diameter 84 of the inlet 80 is less than an inner diameter 86 of the outlet 82. For example, the inner diameter 84 of the inlet 80 may be approximately 2.54 cm (e.g., 1.0 inches), while the inner diameter 86 of the outlet 82 may be approximately 3.18 cm (e.g., 1.25 inches). As may be appreciated, the inner diameter 84 of the inlet 80 may be substantially equal to the inner diameter of the first hose 72. Moreover, the inner diameter 86 of the outlet 82 may be substantially equal to the inner diameter of the second hose 76.

An outer diameter 88 of the tube 74 and an outer diameter 89 of the second hose 76 are substantially equal to an inner diameter 90 of the coupler 78, such that the tube 74 and the second hose 76 may be inserted into the coupler 78 to couple the tube 74 to the second hose 76. Moreover, the inner diameter 91 of the tube 74 is substantially equal to the inner diameter 86 of the second hose 76. Accordingly, the inner diameter of the first hose 72 is smaller than the inner diameter 91 of the tube 74, and smaller than the inner diameter 86 of the second hose 76. For example, the inner diameter 84 of the first hose 72 may be approximately 2.54 cm (e.g., 1.0 inches), while the inner diameter 91 of the tube 74 and the inner diameter 86 of the second hose 76 may be approximately 3.18 cm (e.g., 1.25 inches). In addition, the inner diameter 48 of the hose 40 is smaller than the inner diameter 86 of the second hose 76. For example, the inner diameter 48 of the hose 40 may be approximately 2.54 cm (e.g., 1.0 inches), while the inner diameter 86 of the second hose 76 may be approximately 3.18 cm (e.g., 1.25 inches).

As may be appreciated, the row units 20 coupled to the conduit assemblies 36 may be positioned closer to the inductor box 26 than the row units 20 coupled to the conduit assemblies 38, and the row units 20 coupled to the conduit assemblies 38 may be positioned closer to the inductor box 26 than the row units 20 coupled to the conduit assemblies 70. Conversely, the row units 20 coupled to the conduit assemblies 70 may be positioned farther from the inductor box 26 than the row units 20 coupled to the conduit assemblies 38, and the row units 20 coupled to the conduit assemblies 38 may be positioned farther from the inductor box 26 than the row units 20 coupled to the conduit assemblies 36. For example, in an implement 10 having twenty-four rows, the conduit system 32 may be arranged as follows: row units 20 for rows eight through seventeen (e.g., positioned in the central portion of the implement 10 proximate to the inductor box 26) may receive product from conduit assemblies 36, row units 20 for rows seven and eighteen (e.g., positioned adjacent laterally outward from rows eight through seventeen) may receive product from conduit assemblies 38, and row units 20 for rows one through six and nineteen through twenty-four (e.g., positioned laterally outward from rows seven and eighteen) may receive product from conduit assemblies 70. As another example, in an implement 10 having thirty-six rows, the conduit system 32 may be arranged as follows: row units 20 for rows fourteen through twenty-three (e.g., positioned in the central portion of the implement 10 proximate to the inductor box 26) may receive product from conduit assemblies 36, row units 20 for rows nine through thirteen and twenty-four through twenty-eight (e.g., positioned laterally outward from either side of rows fourteen through twenty-three) may receive product from conduit assemblies 38, and row units 20 for rows one through eight and twenty-nine through thirty-six (e.g., positioned laterally outward from rows nine and twenty-eight) may receive product from conduit assemblies 70.

In certain embodiments, an average diameter of the conduit assemblies may vary between different conduit assemblies 36, 38, and 70. For example, conduit assemblies 36 positioned in the central portion of the implement 10 may have a smaller average diameter than conduit assemblies 38, and 70 positioned laterally outward from the conduit assemblies 36. Furthermore, conduit assemblies 38 that are nearer the central portion of the implement 10 may have a smaller average diameter than conduit assemblies 70 positioned laterally outward from the conduit assemblies 38. As may be appreciated, the difference between average diameters of adjacent conduit assemblies may be significant to provide more balance to the pneumatic distribution system 24. For example, in certain embodiments, there may be at least approximately a one percent difference between average diameters of adjacent conduit assemblies to provide more balance to the pneumatic distribution system 24.

The pneumatic distribution system 24 may operate in a more balanced manner by using the conduit system 32 described herein. For example, by using smaller diameter hoses for the inner row units 20 and by using larger diameter hoses for the outer row units 20, agricultural product may be more uniformly distributed. Thus, planting operations may be performed more efficiently with fewer clogs in the conduit system 32 and/or more evenly spaced seeds throughout the field.

Figure 4:
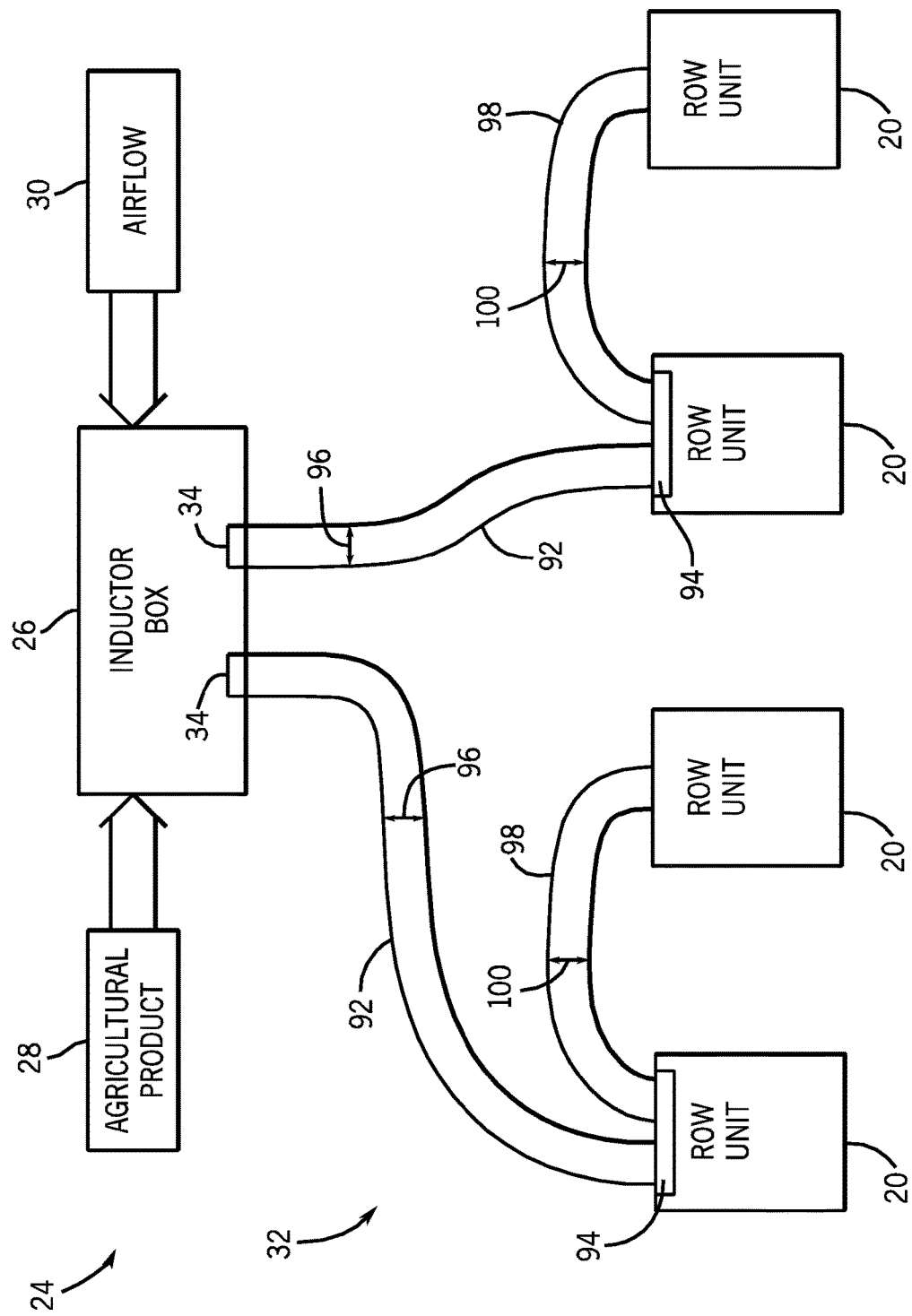
FIG. 4 is a schematic diagram of an embodiment of a pneumatic distribution system having a conduit system with a networked configuration.

FIG. 4 is a schematic diagram of an embodiment of the pneumatic distribution system 24 having the conduit system 32 with a networked configuration. As illustrated, a hose 92 extends between the output port 34 of the inductor box 26 and a manifold 94 of the row unit 20. In certain embodiments, the hose 92 is a flexible hose that facilitates routing between the output port 34 and the row unit 20. The hose 92 has an inner diameter 96. In certain embodiments, the inner diameter 96 may be approximately 3.18 cm (e.g., 1.25 inches). A hose 98 is also coupled to the manifold 94 and extends between the manifold 94 of the row unit 20 and an adjacent row unit 20. In certain embodiments, the hose 98 is a flexible hose that facilitates routing between the manifold 94 and the row unit 20. The hose 98 has an inner diameter 100. In certain embodiments, the inner diameter 100 may be approximately 2.54 cm (e.g., 1.0 inches). This same routing pattern may be repeated for all row units 20 of the implement 10 to produce the networked (e.g., spider) configuration. Accordingly, in certain embodiments, every other row unit 20 is coupled directly to the inductor box 26 using the hose 92, while each remaining row unit 20 is coupled directly to a manifold 94 of an adjacent row unit 20 using the hose 98. The inner diameter 100 of the hose 98 may be smaller than the inner diameter 96 of the hose 92 to maintain a desired velocity of agricultural product 28 and airflow 30 through the hoses 92 and 98, and to reduce the possibility of the hoses 92 and 98 from being clogged. By using this networked configuration, agricultural product 28 may be more evenly distributed in a field.

While certain embodiments have been described herein, other embodiments may also facilitate more efficient planting operations with fewer clogs and/or more evenly spaced seeds. For example, certain embodiments may include a hose that increases in diameter from its inlet to its outlet. Moreover, other embodiments may include a hose that extends from a larger diameter outlet port of the inductor box to a row unit.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A pneumatic distribution system for an agricultural implement comprising:
    an inductor box including a plurality of outlet ports, wherein the inductor box is configured to receive an agricultural product and an airflow, to combine the agricultural product with the airflow, and to direct the agricultural product and the airflow through the plurality of outlet ports;
    a plurality of row units each configured to receive the agricultural product and the airflow, and to deposit the agricultural product into soil; and
    a conduit system extending between the plurality of outlet ports of the inductor box and the plurality of row units, wherein the conduit system is configured to direct the agricultural product and the airflow from each outlet port of the plurality of outlet ports to at least two row units of the plurality of row units;
    wherein the conduit system comprises a first hose extending between a first outlet port of the plurality of outlet ports and a first row unit of the plurality of row units, and a second hose extending between the first row unit and a second row unit of the plurality of row units, and wherein a first inner diameter of the first hose is larger than a second inner diameter of the second hose.

2. The pneumatic distribution system of claim 1, wherein the first inner diameter is approximately 3.18 cm.

3. The pneumatic distribution system of claim 1, wherein the second inner diameter is approximately 2.54 cm.

4. The pneumatic distribution system of claim 1, wherein the first row unit is adjacent to the second row unit.

5. The pneumatic distribution system of claim 1, wherein the conduit system comprises a third hose extending between a second outlet port of the plurality of outlet ports and a third row unit of the plurality of row units, and a fourth hose extending between the third row unit and a fourth row unit of the plurality of row units, and wherein a third inner diameter of the third hose is larger than a fourth inner diameter of the fourth hose.

6. The pneumatic distribution system of claim 5, wherein the third inner diameter is approximately 3.18 cm, and the fourth inner diameter is approximately 2.54 cm.

7. The pneumatic distribution system of claim 1, wherein the first hose is flexible, the second hose is flexible, or a combination thereof.

8. A pneumatic distribution system for an agricultural implement comprising:
an inductor box having an outlet port, wherein the inductor box is configured to receive an agricultural product and an airflow, to combine the agricultural product with the airflow, and to direct the agricultural product and the airflow through the outlet port;
a plurality of row units each configured to receive the agricultural product and the airflow, and to deposit the agricultural product into soil; and
a conduit system extending between the outlet port of the inductor box and the plurality of row units, wherein the conduit system is configured to direct the agricultural product and the airflow from the outlet port to the plurality of row units;
wherein the conduit system comprises a first hose extending between the outlet port and a first row unit of the plurality of row units, and a second hose extending between the first row unit and a second row unit of the plurality of row units, and wherein a first inner diameter of the first hose is larger than a second inner diameter of the second hose.

9. The pneumatic distribution system of claim 8, wherein the first inner diameter is approximately 3.18 cm.

10. The pneumatic distribution system of claim 8, wherein the second inner diameter is approximately 2.54 cm.

11. The pneumatic distribution system of claim 8, wherein the first row unit is adjacent to the second row unit.

12. The pneumatic distribution system of claim 8, comprising a second plurality of row units, wherein each row unit of the second plurality of row units is configured to receive the agricultural product and the airflow, and to deposit the agricultural product into the soil;
wherein the inductor box has a second outlet port, and the inductor box is configured to direct the agricultural product and the airflow through the second outlet port;
wherein the conduit system extends between the second outlet port of the inductor box and the second plurality of row units, and the conduit system is configured to direct the agricultural product and the airflow from the second outlet port to the second plurality of row units; and
wherein the conduit system comprises a third hose extending between the second outlet port and a third row unit of the second plurality of row units, and a fourth hose extending between the third row unit and a fourth row unit of the second plurality of row units, and wherein a third inner diameter of the third hose is larger than a fourth inner diameter of the fourth hose.

13. The pneumatic distribution system of claim 12, wherein the third inner diameter is approximately 3.18 cm, and the fourth inner diameter is approximately 2.54 cm.

14. The pneumatic distribution system of claim 8, wherein the first hose is flexible, the second hose is flexible, or a combination thereof.

15. A pneumatic distribution system for an agricultural implement comprising:
an inductor box having an outlet port, wherein the inductor box is configured to receive an agricultural product and an airflow, to combine the agricultural product with the airflow, and to direct the agricultural product and the airflow through the outlet port;
a first row unit and a second row unit, wherein each row unit of the first and second row units is configured to receive the agricultural product and the airflow, and to deposit the agricultural product into soil, and wherein the first row unit comprises a manifold; and
a conduit system configured to direct the agricultural product and the airflow from the outlet port to the first and second row units, wherein the conduit system comprises a first hose extending between the outlet port and the manifold of the first row unit, and a second hose extending between the manifold of the first row unit and the second row unit, and wherein a first inner diameter of the first hose is larger than a second inner diameter of the second hose.

16. The pneumatic distribution system of claim 15, wherein the first inner diameter is approximately 3.18 cm.

17. The pneumatic distribution system of claim 15, wherein the second inner diameter is approximately 2.54 cm.

18. The pneumatic distribution system of claim 15, wherein the first row unit is adjacent to the second row unit.

19. The pneumatic distribution system of claim 15, comprising a third row unit and a fourth row unit, wherein each row unit of the third and fourth row units is configured to receive the agricultural product and the airflow, and to deposit the agricultural product into the soil, and wherein the third row unit comprises a manifold;
wherein the inductor box has a second outlet port, and the inductor box is configured to direct the agricultural product and the airflow through the second outlet port;
wherein the conduit system is configured to direct the agricultural product and the airflow from the second outlet port to the third and fourth row units; and
wherein the conduit system comprises a third hose extending between the second outlet port and the manifold of the third row unit, and a fourth hose extending between the manifold of the third row unit and the fourth row unit, and wherein a third inner diameter of the third hose is larger than a fourth inner diameter of the fourth hose.

20. The pneumatic distribution system of claim 19, wherein the third inner diameter is approximately 3.18 cm, and the fourth inner diameter is approximately 2.54 cm.

* * * * *